United States Patent Office 3,100,402
Patented Aug. 13, 1963

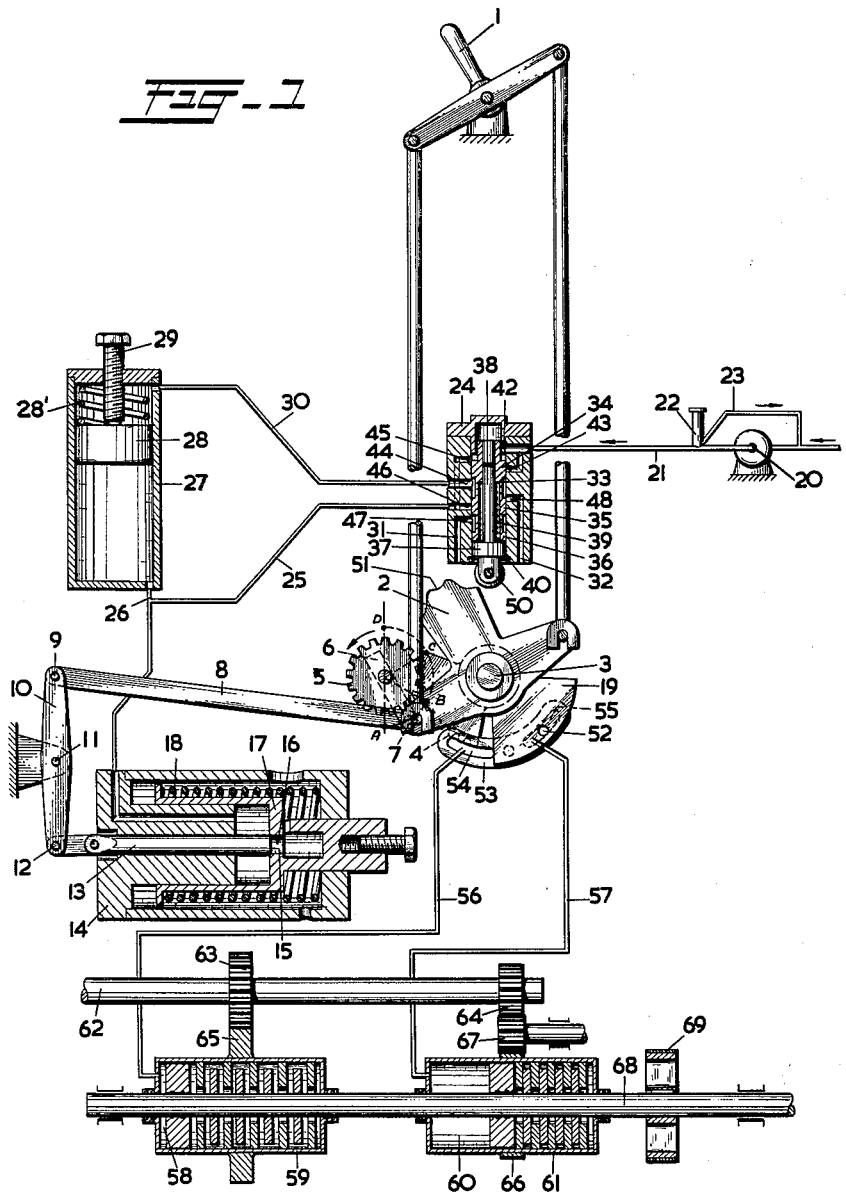

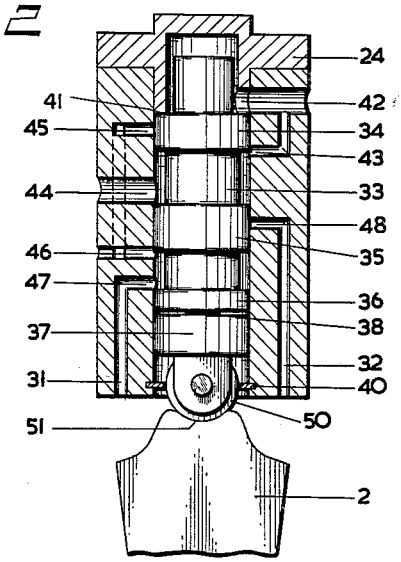
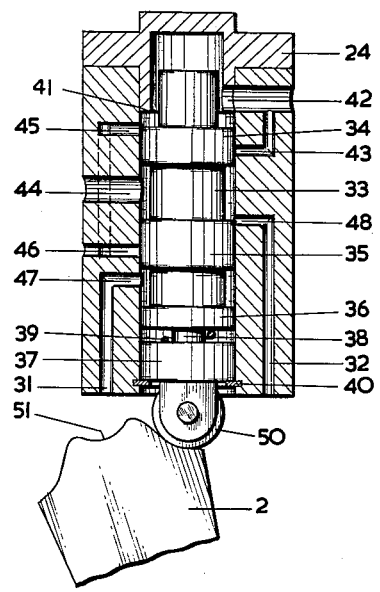

3,100,402
PRESSURE FLUID CONTROL DEVICE FOR A PROPULSION PLANT, PARTICULARLY FOR MARINE PROPULSION
Marius Cornelis Pieterse, 126 Rijndijk, Voorschoten, Netherlands
Filed Nov. 21, 1960, Ser. No. 70,866
6 Claims. (Cl. 74—472)

This invention relates to a pressure fluid control device for a propulsion plant, particularly for marine propulsion, with a common actuating member for a control member for the energy supply and for a control member for a reversible clutch, set of clutches for ahead and astern driving or gear of a kind needing some time lapse to be reversed or shifted after its control member has been actuated, said actuating member being mechanically coupled to the control member for the clutch or gear.

The normal reversing clutches or gears applied together with non-reversing diesel engines, turbines and other prime movers, show a valve member for hydraulic fluid, which member is mechanically operated by an actuating member such as a hand control lever, the hydraulic fluid in the clutch exerting pressure on sets of plates to couple the propeller shaft or the like to the engine so as to rotate either in the same or in the opposite direction in dependency upon the set of plates which is pushed into contact.

A serious problem in such plants is that the single actuating member is sometimes moved from the part of its path in which it controls the energy supply, e.g. the fuel supply, with the propeller shaft rotating in one direction, much too rapidly through the zone for reversing the clutch to the zone for fuel control with the propeller shaft rotating in the opposite direction. If this is done too rapidly it is possible that the clutch has not yet been reversed before a considerable quantity of fuel or other source of energy is supplied to the engine, so that it will accelerate considerably and in the wrong direction. This gives much harm to the plant.

This invention aims at preventing this disadvantage with a simple and reliable device, taking up only a small space, being easily replaceable and repairable.

To obtain this a control device as given above in the preamble is according to this invention characterized in that valve means are provided, connected to the supply line of pressure fluid and adapted in one position to allow said fluid to flow to the control member for the energy supply and to shut off this flow in another position, said valve means being closed positively by the actuating member during the part of its actuating path in which the clutch or gear is reversed or shifted thereby, said valve means being opened during the part of the actuating path of the actuating member in which the energy supply is controlled, in which a variable volume retarding space is provided with a displacement member movable therein between extreme positions, the space at one side of said member being connected to the fluid line between the valve means and the control member for the energy supply, said space at the other side of said displacement member being also connected to the said valve means, said valve means having valve parts and ports so that, when it opens the fluid line to the control member for the energy supply, it closes a drain from said line and opens a drain from said other side of said displacement member, and that, when it closes the said fluid line to the control member for the energy supply, it opens said drain from said fluid line and closes said drain from said other side of the displacement member, opening the supply of pressure fluid to said other side.

This gives a constant time lapse before it is possible when switching from one direction of rotation of the propeller shaft to the other, to augment the energy or fuel supply, so that this is only possible in a stage in which it is certain that the clutch or gear has been reversed or shifted.

The invention will now be explained further on the basis of the attached drawings, from which description further features, details and advantages of this invention will become clear.

FIGURE 1 shows diagrammatically the essential parts of a device according to the invention.

FIGURE 2 is a sectional view through the valve means in the position of the valve member when the device is out of operation or when the clutch or gear is being reversed or shifted.

FIGURE 3 is a sectional view through said valve means, in part along another plane showing in part other ports and ducts positioned in staggered relationship to several ports and ducts according to FIGURE 2, with the valve member in the position of fuel control.

The embodiment shown relates to a marine propulsion plant having a diesel engine with fuel control, and a reversible clutch of the hydraulic servomotor type with sets of friction plates.

A single actuating member, such as a hand operated lever 1, moves a cam element 2 pivoted on a shaft 3 and having a maximum angle of rotation of 90° by means of rods and, if desired, by remote control. Through a gear wheel segment 4, rotation of the cam element 2 entrains rotation of a gear wheel 5 having one-half as many teeth as segment 4 and which thus has a maximum angle of rotation of about 180°. Connected to said gear wheel 5 is an arm 6 pivotally connected at 7 to a rod 8 pivoted at 9 to a lever 10. This lever 10 is pivotally supported at 11 to the stationary structure and pivotally connected at 12 to a control rod 13 of a hydraulic servomotor for the control of the fuel supply to the diesel engine of the ship. The rod 13 is guided along a considerable part of its length in a stationary part 14. The end 15 of the rod 13 slidably fits in a central bore 16 of an adjustable part 17. Part 17 is guided around the stationary part 14 and in a surrounding casing and which is urged to the left by a spring 18. The part 17 is connected to the fuel control member of the engine, such as the rotatable plunger of a fuel injection pump, and a speed governor could also engage this fuel control member.

The hydraulic fluid for the servomotor 13 to 17 for the fuel control is supplied by a positive displacement pump 20 to a duct 21. The duct 21 has an overflow valve 22 having a spring to prevent overflow up to a predetermined pressure in the duct 21 and to allow the fluid to flow back to the suction side of the pump through an overflow duct 23 when the pressure in the duct 21 rises above said predetermined value. The duct 21 leads to a valve casing 24. Four further ducts are connected to this valve casing. A duct 25 leads to the stationary part 14 of the fuel control servomotor and this duct 25 has a branch connection 26 to the lower part of a retarding section 27 which is a cylinder with a piston 28 making a sliding fit therein and being vertically movable therein. A screw-threaded adjustable abutment 29 limits the upward movement of the piston 28 in an adjustable manner. If desired a light spring 28' may urge the piston 28 downwardly.

A duct 30 connects the retarding space of section 27 above the piston to the valve casing 24.

Moreover the valve casing has two drain connections 31 and 32.

In the valve casing 24, a valve member 33 is provided which is adapted to slide vertically in a bore in the valve casing and provided with three flanges 34, 35 and 36, connected by parts of smaller diameter, as shown. In the lower part of the same bore in the valve casing a follower element 37 is provided having a vertical rod 38 guided in a bore in the valve member 33 and surrounded by a spring 39 projecting some distance into the valve member 33 and urging member 33 and the follower element 37 apart. A snap ring 40 limits downward movement of the follower element 37 and a shoulder 41 in the casing limits upward movement of the valve member 33.

The supply duct 21 from the pump 20 is connected to the casing 24 at two ports, a port 42 in the upper part thereof and a lower port 43. The line 30 to the retarding section is connected to a port 44 and the duct 25 to the fuel control and to the other side of the retarding space is connected to ports 45 and 46. The drain duct 31 is connected to a port 47 and the drain duct 32 to a port 48.

The follower element 37 is provided with a downwardly extending roller 50 and the cam element 2 is provided with a cam surface 51 cooperating therewith.

The cam element 2 is provided with a fourth arm 19 provided with a hole 52, to which fluid under pressure is supplied. The arm 19 has a flat, accurately machined surface sliding sealingly along a plane stationary surface 53, provided with two slots 54 and 55, each connected to a pressure fluid duct 56 and 57, respectively. The duct 56 leads to the hydraulic operating means 58 of the rear clutch part 59 and the duct 57 leads to such means 60 of the forward clutch part 61. Said means and clutches with plates on the two parts to be coupled are only shown diagrammatically, as such means are generally known and widely used. The shaft 62, driven by the engine, has two gear wheels 63 and 64. Wheel 63 engages a toothed ring 65 on the casing of clutch 59 directly and wheel 64 engages a toothed ring 66 on the casing of clutch 61 through a pinion 67, so that the casings of both clutches always rotate in opposite directions. Sets of friction plates are alternately connected to the casing and to the propeller shaft 68 in each clutch, so as to be rotatable alternately with such casing and shaft, but to be slidable axially with respect thereto. When fluid pressure is exerted on the hydraulic operating means 58 or 60, the annular piston therein, surrounding the propeller shaft, is moved towards the sets of friction plates and forces them to abut against one another and to couple by friction.

A quick release brake 69 could surround the shaft 68 to keep the propeller stationary when both clutches are disengaged.

The operation of this device is as follows. Imagine that the parts are in the position shown in FIGURE 1. In this position the follower element is in the lowest position due to gravity and the spring 39, and the valve member 33 is somewhat below its highest position due to fluid pressure acting on the upper end face thereof. Thus the ports 44, 45, 47 and 48 are entirely or partially open and the ports 43 and 46 are closed by flanges of the valve member. Thus, fluid under pressure flows from the supply line 21 through port 42 (always open), port 45 and duct 25 to the space between the stationary part 14 and the movable part 17 of the fuel control servomotor. Through connection 26 this fluid acts upon the lower part of piston 28 and keeps it in its highest position against the abutment 29. The space above the piston 28 is connected to drain 32 through line 30, port 44 and port 48. Now imagine that the actuating member 1 is moved to a position for more or less fuel. The cam element 2 rotates somewhat so that control rod 13 is moved by means of the gear connection 4, 5 and the linkage 6, 8, 10. If control rod 13 is moved to the left the bore 16 in part 17 is opened somewhat, the fluid between the parts 14 and 17 is allowed to flow out, the pressure between these parts and in the duct 25 falls, and the spring 18 is thus able to move part 17 to the left. If rod 13 moves to the right the bore 16 is further closed, the pressure between parts 14 and 17 rises since no fluid can flow out and thus part 17 is moved to the right against spring 18. Thus, part 17 exactly follows the movements of rod 13.

In FIGURE 1 the paths of the pivot 7, for which such fuel control takes place, have been indicated by A—B and C—D.

If the actuating member is moved in the zone in which the pivot 7 moves from the zone A—B or from the zone C—D into the zone B—C the rod 13 moves to the left so far that the part 17 touches the flange of part 14 and thus may no longer follow the movement of rod 13. With movement in zone B—C there is thus no fuel control and the fuel quantity injected into the engine is a minimum or zero. In this zone the opening 52 of arm 19 of cam element 2 has left the slot 55 and moves towards slot 54. As soon as this is reached, pressure fluid flows to clutch means 58 thus pressing the friction plates in the casing of clutch 59 together to make the clutch become active. The arm 19 has meanwhile, with its trailing edge, passed part of the slot 55, so that the hydraulic pressure in clutch part 60 falls off, thus allowing the friction plates therein to move apart, so that clutch 61 becomes inactive. Thus, the driving direction of the propeller is reversed with constant direction of rotation of the engine. During this movement of the cam element 2 the cam face 51 thereof passes through the vertical position and pushes roller 50 and follower element 37 and through spring 39 also pushes valve member 33 upwardly until the valve member 33 reaches the uppermost position shown in FIGURE 2. In this position ports 45 and 48 are closed and ports 43 and 46 are opened. Thus, fluid under pressure from supply line 21 passes through port 43 and through port 44 (always open) to duct 30 and to the retarding section 27 above the piston 28. As the lower part of the retarding section 27 is able to drain out its fluid both through the bore 16 of the fuel control servomotor and through duct 25, ports 46 and 47 and drain 31, the piston 28 is moved downwardly.

As soon as the cam element 2 is rotated so that pivot 7 is moved from point B entirely to point C or from C entirely to B the cam surface 51 leaves the roll 50 and thus the follower element 37 is allowed to move downwardly by the spring 39. The fluid pressure on the top surface of the valve member 33 is low as long as the piston 28 is able to move downwardly. Thus, the spring 39 maintains the valve member 33 in the upper position of FIGURE 2. As soon as the piston 28 reaches its lowest position the fluid can no longer flow through the valve to the upper part of the piston 28 and thus the fluid pressure rises and the valve member 33 is urged downwardly by said pressure on the upper end face thereof. Thus, the position of FIGURES 1 and 3 is again assumed so that the pressure fluid flows through ports 42 and 45 and duct 25 to space 27 below piston 28. The fuel control rod has meanwhile been moved to the right into the bore 16 so that no fluid can pass out, but the pressure in the fuel control servomotor cannot rise because the piston 28 moves upwardly against only small resistance as the fluid above piston 28 is easily pushed out from the retarding section 27 through duct 30, port 44, port 48 and drain 32. Thus, no increase of the fuel supply is possible until the piston 28 touches the abutment 29, after which no fluid is able to pass through the duct 25, so that the fluid pressure increases and member 17 thus begins to control the fuel again.

Thus if the actuating member is moved by the operator so rapidly from the zone in which the pivot 7 is in the zone A—B to the zone in which the pivot 7 is in the zone C—D, that the clutch has not been entirely reversed before the pivot 7 reaches the other fuel control zone it is nevertheless impossible to control the fuel supply until the piston 28 has moved entirely downwardly and entirely upwardly again, thus giving a fixed delay time always sufficiently long to prevent dangers by untimely supplying too much fuel to the engine.

By adjusting the spring on the overflow valve 22 to open at a pressure only slightly higher than the pressure at which the valve member 33 begins its downward movement by fluid pressure on the end face thereof, the valve member when moving downwardly (giving an increase of the upward pressure thereon by spring 39) will take up an equilibrium position, in which the overflow opens as well. It is thus possible to use a much smaller volume of the retarding space 28 than would be necessary of the overflow valve 22 would not open, with the same delay time. Moreover even with much variation in pump speed the delay time is maintained substantially constant by this adjustment of the overflow valve.

What I claim is:

1. A pressure fluid control device for a propulsion plant, comprising in combination:
   (a) a hydraulically operated control member for an energy supply;
   (b) a hydraulically operated control member for reversible movement transmitting means;
   (c) an actuating member common to both control members and mechanically coupled to said transmitting means control member;
   (d) a source of pressure fluid;
   (e) valve means including drain means and in communication with said pressure fluid source and having a number of control positions, one position directing pressure fluid to said energy supply control member and another position shutting off this flow, said valve means being connected to said actuating member and being positively closed thereby with respect to said pressure fluid source during the time said transmitting means are reversing and being open during the time the energy supply is being controlled;
   (f) variable volume hydraulic retarding means having a displacement member movable therein between extreme positions, a variable volume chamber defined on each side of said displacement member, one chamber being connected to the valve means portion for actuating said energy supply control member, the other chamber being connected to said valve means; and
   (g) said drain means being connected to said other chamber and disconnected from said one chamber when the valve means supply pressure fluid to said energy supply control member, and connected to said one chamber and disconnected from said other chamber when the valve means prevent supply of pressure fluid to said energy supply control member.

2. A device as defined in claim 1, wherein said actuating member is mechanically connected to said valve means only when said transmitting means are reversing and said valve means are urged to the position wherein pressure fluid is provided to the energy supply control member, said valve means including a spring for urging said valve means to the position which disconnects said energy supply control member from the pressure fluid.

3. A pressure fluid control device according to claim 2, wherein said pressure fluid source includes a pump for supplying pressure fluid to the valve means, said pump having an overflow valve adjusted to a fluid pressure only slightly above the fluid pressure at which the valve means begins to open to allow fluid to flow towards the control member for the energy supply against the spring biasing said valve means to closing position.

4. A pressure fluid control device according to claim 1, characterized in that the effective volume of the retarding means is adjustable by an abutment for the terminal position of the displacement member therein, said abutment being adjustable axially by a screw threaded part operable exteriorly of said chambers.

5. A pressure fluid control device according to claim 2, wherein said valve means comprise a single valve member of cylindrical shape, having at least two flanges making a sliding fit in the valve casing, one flange being on one face always under the pressure of the fluid supply on an end face and controlling a port to the line towards the control member for the energy supply and a port for the supply of fluid to the retarding means at the side of the displacement member therein opposite to the side connected to said line towards the control member for the energy supply, and the second flange controlling said drain means including two ports to drain, one for each said line to the retarding space.

6. A pressure fluid control device according to claim 5, wherein said valve means includes a follower element in the valve casing opposite to the end face of the valve member on which the incoming fluid supply pressure acts and in the same bore therewith, cam means and said follower element cooperating to form the mechanical connection between the actuating member and the control member for the transmitting means during reversing, said follower element being slidable in the valve casing bore so that when moved towards the valve member to move this valve member to the position in which the pressure fluid is allowed to flow from the supply thereof to the retarding means at the side of the displacement member therein opposite to the side connected to the line towards the control member for the energy supply, in which position of the valve member the drain from the other side of the displacement member is opened thereby, the said spring acting on the valve member being provided between said valve member and said follower element to urge the follower element to move away from the valve member.

References Cited in the file of this patent
UNITED STATES PATENTS

| 2,388,357 | Hewitt | Nov. 6, 1945 |
| 2,396,231 | Brill | Mar. 12, 1946 |
| 2,426,064 | Stevens | Aug. 19, 1947 |
| 2,524,487 | Stevens | Oct. 3, 1950 |
| 2,883,876 | Taylor | Apr. 28, 1959 |
| 2,925,156 | Grant et al. | Feb. 16, 1960 |